United States Patent [19]

Kallen

[11] 4,049,962
[45] Sept. 20, 1977

[54] LINE EDGE FOLLOWER
[75] Inventor: George Harold Kallen, Indianapolis, Ind.
[73] Assignee: Union Carbide Corporation, New York, N.Y.
[21] Appl. No.: 709,639
[22] Filed: July 29, 1976
[51] Int. Cl.$^2$ ............................................. G05B 1/00
[52] U.S. Cl. .................................. 250/202; 33/1 M; 318/577
[58] Field of Search ................ 250/202, 578; 318/577; 33/1 M

[56] References Cited
U.S. PATENT DOCUMENTS 3,529,084  9/1970  Rich ..................................... 250/202
3,932,743  1/1976  Sitnichenko ........................ 250/202

Primary Examiner—Rudolph V. Rolinec
Assistant Examiner—Michael J. Tokar
Attorney, Agent, or Firm—John R. Doherty

[57] ABSTRACT

A system incorporating a photosensitive device and associated circuitry for scanning a line to be traced.

3 Claims, 6 Drawing Figures

LINE EDGE FOLLOWER

This invention relates to a system for tracing a line or the edge of a line to cause an X-Y coordinate drive machine to follow the path described by the line. More particularly the invention relates a completely non-mechanical tracing system for controlling the movement of the X-Y coordinate drive machine.

Systems for tracing lines have been known in the prior art for many years. However, most presently known systems require mechanical rotation of the scanning head or of the optics associated with the sensing device to achieve satisfactory tracing.

The system of the present invention automatically follows the edge of a line or template and does not employ moving parts such as rotating mirrors or scanning motors. The present invention is predicated on the use of a photo sensor circular array which is electronically scanned. Typical photosensor arrays are available commercially. One such array preferably used in this invention is a monolithic array of 64 silicon photodiodes on a circle of 2 mm. in diameter. The array is self-scanned in a clockwise direction by an integrated 64 stage ring counter. The read out rate is set by the frequency of the complementary square wave clocks which are required to drive the ring counter. A sync pulse is provided once each scan at a reference point in the circle.

Using a device of the type described the invention was developed as shown in the drawings wherein.

Figure 1:
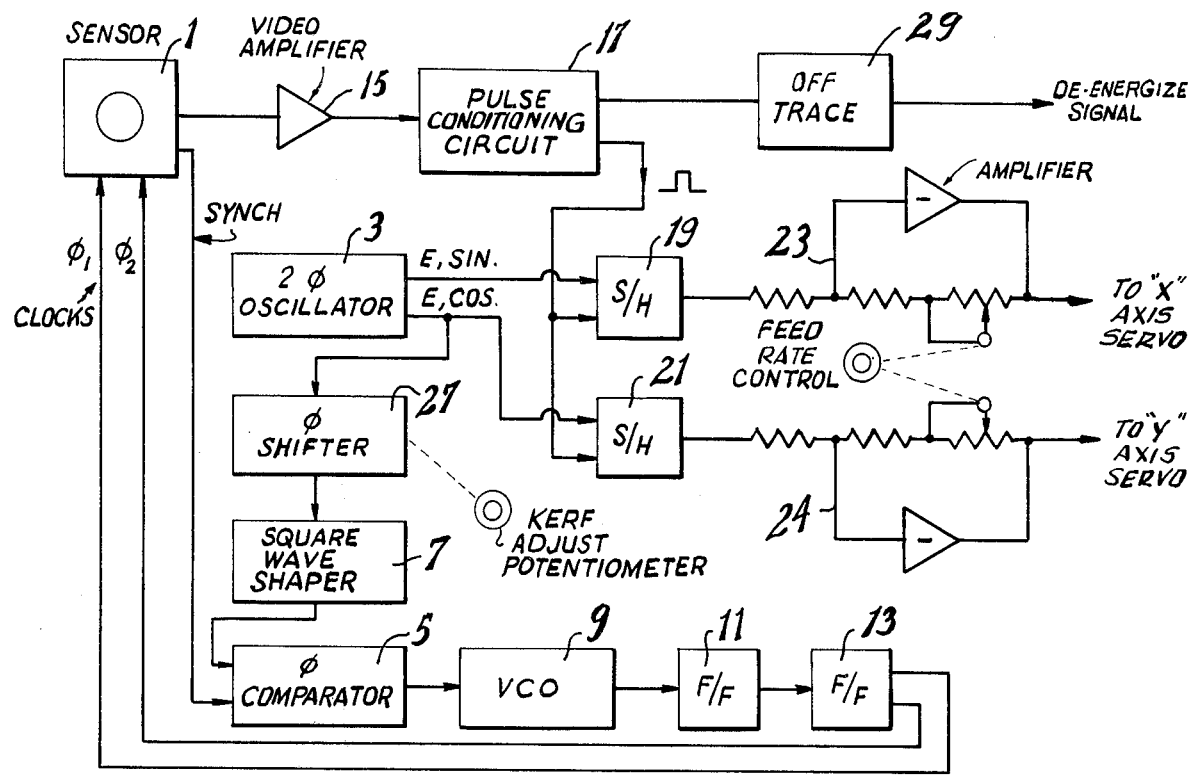
FIG. 1 is a block diagram of a system embodying the concept of the invention.

Referring now to the drawings and particularly FIG. 1, the system of the invention includes, for example, a photosensor circular array 1 of the type described above (see FIG. 6). The photosensor has associated therewith a lens system for determining the radius of the field of scan. The lens system is housed with the photosensor (see FIG. 5). The photosensor array 1 is incorporated in and forms part of a phase lock circuit which includes a two-phase oscillator circuit 3 which produces a sine wave and a cosine wave. The two phase oscillator 3 is connected to phase comparator circuit 5 so that the cosine wave is supplied to the phase comparator circuit 5. If desired, the sine wave could be supplied to phase comparator circuit. Also, and as shown in this embodiment, the cosine wave is preferably passed through a square wave shaper 7 to change the cosine wave to a square wave. The output from the phase comparator circuit 5 is fed to a voltage control oscillator 9 which acts to compensate for any error in synchronization as will be seen shortly. The output from the phase lock loop comparator circuit is a complementary series of clock pulses which are fed to the photosensor to sequentially sample each of the 64 photosensitive elements in the photosensitive circular array. Flip-flop circuit 11 and 13 are used to provide the desired frequency (32 K Hz) for each of the complementary clock pulse inputs to the photosensitive array. Accordingly, the pulses are provided at a frequency of 64 K Hz for a 64 element photosensitive array. The photosensitive array 1 then produces a video output signal and emits a sync pulse which is fed back to the comparator circuit 5 to synchronize the angular position of the video pulses with the sine and cosine wave forms produced by the two phase oscillator circuit 3. Any error is such synchronization is compensated for by the voltage controlled oscillator 9. A video amplifier 15 is connected to the photosensor for amplifying the video output signal and to provide such amplified video signal to a pulse conditioning circuit 17. The pulse conditioning circuit changes the form of the video outout signal to squared waveform and feeds such pulses to a first sample and hold circuit 19 which received a sine wave from the two-phase oscillator 3 and to a second sample and hold circuit 21 which received a cosine wave from the two-phase oscillator 3. The sine and cosine waves are sampled by the pulse in the circuits 19 and 21. The signals generated in circuits 19 and 21 as a result of the sampling are fed to the X and Y feed rate circuits at 23 and 24 respectively. These circuits in turn operate the X and Y servos whereby the results of the X and Y movement is the path being described by the line being traced.

It is often desired to provide for kerf compensation where the tracer system is to be used on a X-Y coordinate drive, flame, plasma rc, or laser cutting machine. In this case, a phase shifter circuit 27 is connected between the two-phase oscillator 3 and the square wve shaper 7. The phase shifter circuit electronically shifts the relationships of the elements in the photosensor array to the coordinate axes of the machine. For example, in the case of no kerf, element 61 (see FIG. 6) may be the element which signals the machine to move due north. With kerf, the element which signals the machine to move due north will be some other element, for example element 1.

In most cases it is desirable to include an off-trace circuit 2 which operates to turn the system off if the photosensor array 1 should lose the line being traced.

All the individual circuits which when combined make up the system of this invention are well known circuits. Any specific circuitry may be used to accomplish the functions desired. For example, there are many specifically different circuit arrangements which will provide the cosine and sine wave forms provided by the two-phase oscillator circuit. Accordingly, the details of such circuits are well known to one skilled in the art of circuit designs.

Figure 2:
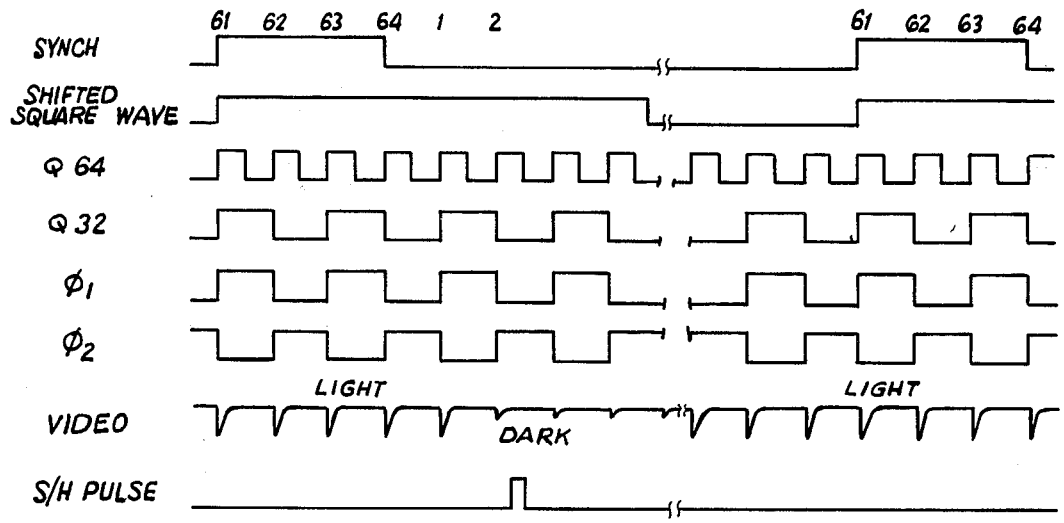
FIG. 2 is an illustration of wave forms at various stages in the system of FIG. 1 showing the timing relationships therebetween.

FIG. 2 shows the wave forms at various points in the system of the invention. The wave form labelled "sync" shows the sync pulse provided by the photosensor which is used as the synchronizing pulse for the system. The phase shifted square wave is the wave form of a squared up sine wave which is shifted in phase relative to the sine/cosine waves that are applied to the sample and hold circuit. This provides the kerf compensation electronically, that is without the need for mechanically rotating the photosensor. The wave form labelled Q 64 is the wave form out of the first flip-flop circuit and Q 32 is the wave form out of the second flip-flop. The wave forms labelled $\phi 1$ and $\phi 2$ are the clock pulses supplied to the photosensor. The video wave form illustrates the video pulses emitted by the photosensor. The S/H pulse illustrates the pulse which samples the sine/cosine waves in the sample and hold circuit. Sampling of the sine/cosine wave is better illustrated in FIG. 4.

Figure 3:
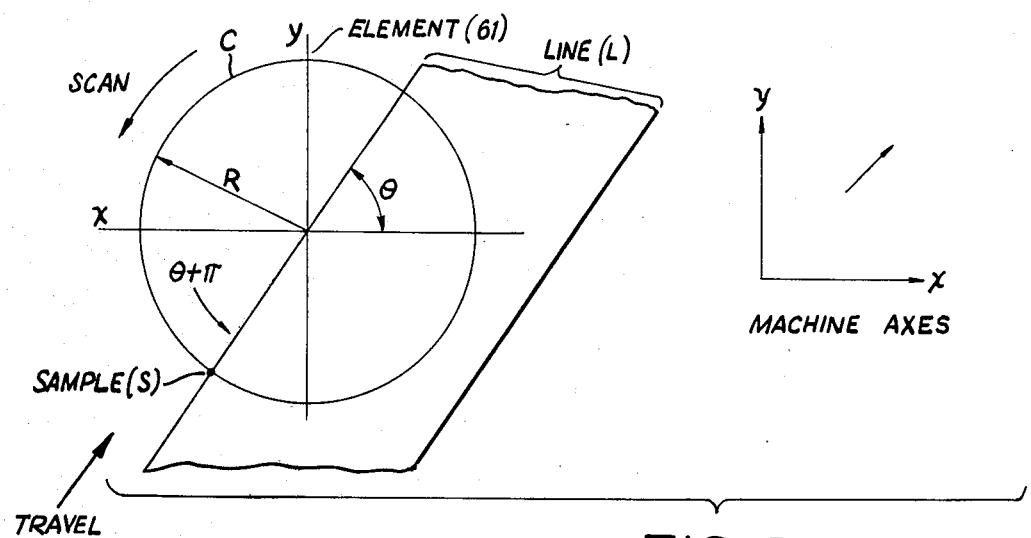
FIG. 3 is a diagram illustrating the operation of the system.
Figure 4:
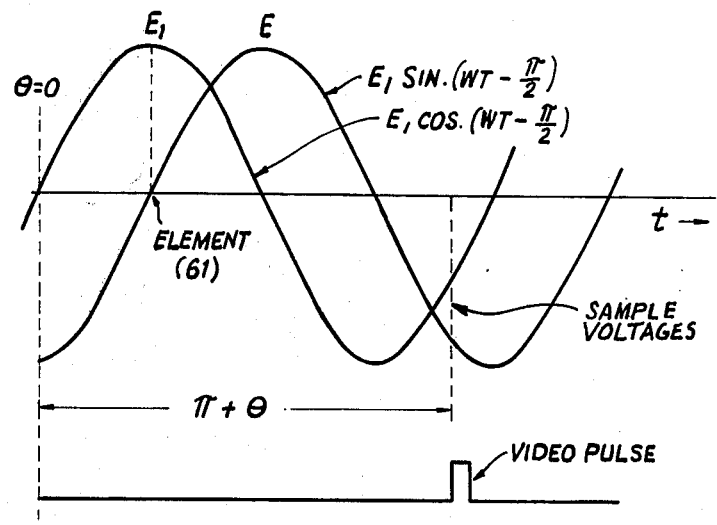
FIG. 4 is a diagram illustrating the sampling of sine and cosine wave forms by the video pulse wave form.

The principle of operation is illustrated in FIGS. 3 and 4. Referring to FIG. 3, the line being traced is shown at L. The field of scan is shown by the circle C having radius R. Element 61 is the element in the photosensor array which when activated directs the machine due north if the line were directly under the element in scanning. In this illustration the line is sampled at point S which is $(\theta + \pi)$ radians from the X axis. The point at the diagonally opposite point $\theta$ radions from the X axis could be sampled if desired. Circuitry not shown, can be used to reject all video signals 180° away from the desired video signal so that scanning takes place at the desired point. Referring to FIG. 4, when point S is sampled a video pulse is supplied to the sample and holds circuits 19 and 21 (after the Wave has been conditioned in the pulse conditioning circuits 17). This pulse is sampled against the sine and cosine waves in the sample and hold circuits 19 and 21. The sample and hold circuits send a signal to the X and Y servos respectively.

The X axis velocity will be as shown by the equation $Vx = K(FR) \sin \theta$ when FR is the feed rate selected by the potentiometer setting in the feed rate circuit 23 and K is some constant. Likewise the Y axis velocity is $Vy = K(FR) \cos \theta$ where FR is the feed rate selected by the potentiometer setting in the feed rate circuit 25. The resultant velocity VT is the vector sum of Vx and Vy.

The sampled outputs shown in FIG. 4 are negative but they are inverted by the feed rate operational amplifier shown in the feed rate circuits 23 and 25.

Figure 5:
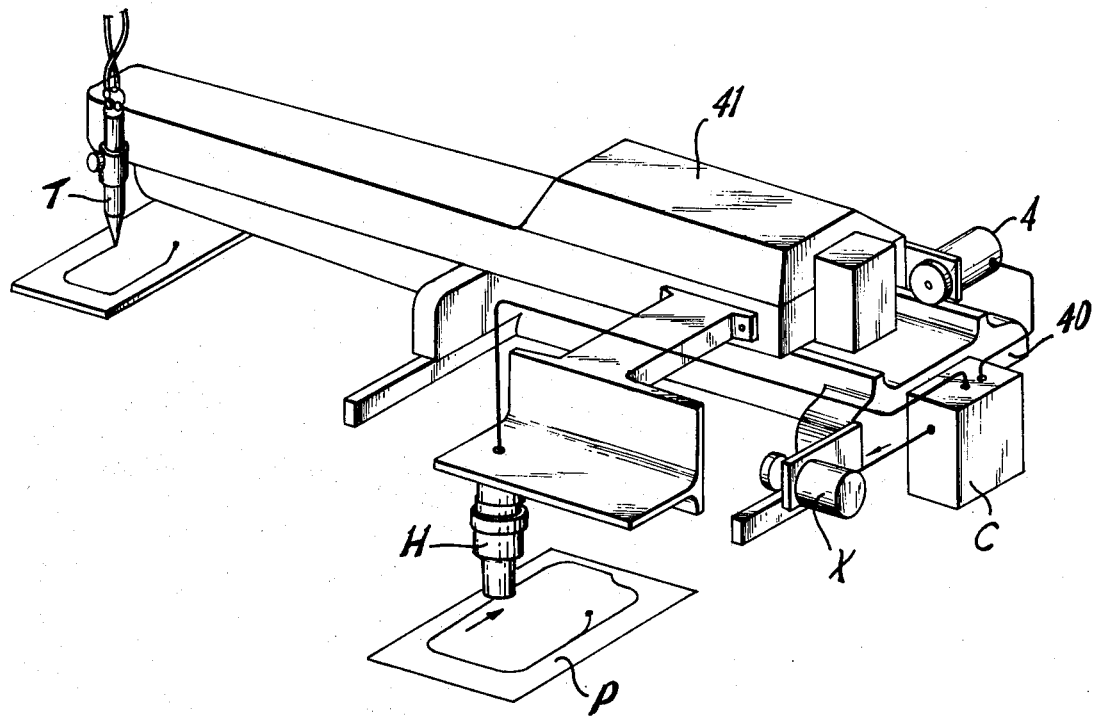
FIG. 5 is a schematic diagram of the photosensor in an X-Y coordinate drive machine.

Referring to FIG. 5, the circular photodiode array consists of a light sensing area which is an annulus A with an outer radius typically 1.05 mm and an inner radius typically 0.95 mm. Within the annulus each element is defined by radii 5.625 degrees apart. Thus there is no dead space between elements and each is approximately about 0.1 × 0.1 mm in area.

A typical X-Y coordinate drive cutting machine incorporating the system of the invention is shown in FIG. 5, the photosensor circular array 1 and lens system is housed in unit H. The control circuit is housed in cabinet C. Signals from Cabinet C go to X motor X and Y motor Y which drive the carriage 40 and 41 respectively. A cutting tool direction. is mounted in carriage 41 and its movement is the vector sum of movement in the X and Y directio. The cut made by tool T will be the same as the template P.

Having described the principle of the invention with respect to certain specific and preferred embodiments, it should now be obvious to those skilled in the art that certain modifications may be made to the arrangement of circuits and that many particular circuit designs may be used to accomplish the desired results.

What is claimed is:

1. A line edge tracer system for use with an X-Y coordinate drive machine to cause said machine to follow the path described by the line edge comprising; a circular photosensor array capable of scanning a field having a radius determined by an optical system associated with said photosensor arrays; a phase-lock circuit including said photosensor array and a two-phase oscillator circuit for producing sine and cosine wave forms; a phase comparator circuit connected to said two-phase oscillator circuit, the output of said phase comparator circuit being connected to a voltage controlled oscillator circuit, the output of said voltage controlled oscillator circuit producing clock pulses to sequentially sample the individual photosensitive elements in said photo sensitive array to produce a video output signal and to cause said photo sensor to emit a sync pulse which is fed back to said phase comparator circuit to synchronize the angular position of said video pulses with the sine and cosine wave forms produced by said two-phase oscillator circuit; video amplifier circuit connected to said photosensor array; a pulse conditioning circuit connected to said video amplifier for receiving the video signal and for changing the wave form of said signal; a sample and hold circuit connected to the two-phase oscillator circuit for receiving said sine and cosine wave forms therefrom and also connected to the pulse conditioning circuit to receive the changed wave form therefrom and also connected to the pulse conditioning circuit to receive the changed wave form therefrom to sample the sine and cosine wave forms by the changed wave forms; and an X and Y axis feed rate control circuit connected to such sample and hold circuits for operating an X servo and a Y servo response to the signal received from such sample and hold circuit whereby the resultant of said X and Y movement being the path described by said line.

2. A system according to claim 1 for coordinate drive cutting machine wherein a phase shifter is included in said phase lock circuit between said two phase oscillator circuit and said phase comparator circuit whereby a change in the phase relationship between the sine and cosine wave forms produced by the two phase oscillator circuit and the syncronizing clock pulses results in an offset between the path the machine would have followed and the actual path the machine is following, thereby producing kerf compensation.

3. A system according to claim 1 including an off trace circuit which monitors the signal produced by the pulse conditioning circuit so that travel of the machine is stopped when no signal is emitted by such pulse conditioning circuit.

* * * * *

UNITED STATES PATENT OFFICE
CERTIFICATE OF CORRECTION

Patent No. 4,049,962                      Dated September 20, 1977

Inventor(s)   G.H. Kallen

It is certified that error appears in the above-identified patent and that said Letters Patent are hereby corrected as shown below:

Column 2, line 10

"is" should be -- in -- .

Column 2, line 31

"rc" should be -- arc -- .

Column 2, line 33

"wve" should be -- wave -- .

Column 3, line 34

Figure 6:
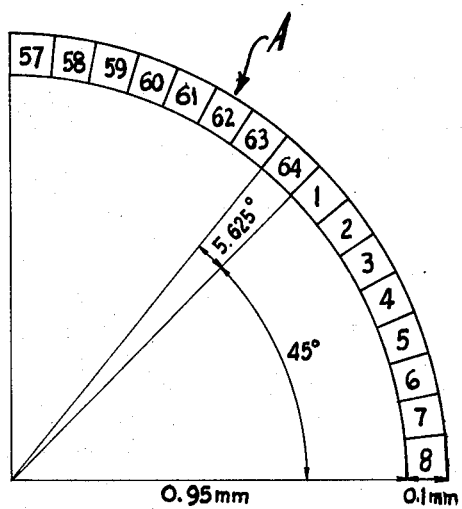
FIG. 6 is a view of part of a typical photosensor used in this invention.

"Fig. 5" should be -- Fig. 6 -- .

Column 3, line 48

"direction should be -- T -- .

UNITED STATES PATENT OFFICE
CERTIFICATE OF CORRECTION

Patent No. 4,049,962  Dated September 20, 1977

Inventor(s) G.H. Kallen

It is certified that error appears in the above-identified patent and that said Letters Patent are hereby corrected as shown below:

Column 3, line 50

"directio." should be -- direction. -- .

Column 4, line 9

"arrays" should be -- array -- .

Signed and Sealed this

Fifteenth Day of May 1979

[SEAL]

Attest:

RUTH C. MASON
Attesting Officer

DONALD W. BANNER
Commissioner of Patents and Trademarks